Patented Oct. 16, 1951

2,571,912

UNITED STATES PATENT OFFICE 2,571,912

PREPARATION OF MELAMINE

Nat H. Marsh, Noroton Heights, Conn., assignor to American Cyanamid Company, New York, N. Y., a corporation of Maine No Drawing. Application July 21, 1950, Serial No. 175,286

3 Claims. (Cl. 260—249.7)

The present invention relates to the preparation of melamine. It is an object of the invention to prepare melamine by reacting ammonia, carbon dioxide and hydrogen cyanide under conditions of super-atmospheric pressure and at elevated temperatures.

The following example illustrates without limiting the invention.

Example 20 g. of hydrogen cyanide, 42 g. of ammonia and 15 g. of carbon dioxide were placed in a 300 cc. autoclave and heated at 350° C. under the autogenously developed pressure of about 5000 p. s. i. for six hours. The autoclave was cooled, vented, and the solid product washed out with 100 cc. of hot water. The wash water was heated to boiling to decompose and drive off ammonium carbamate, reduced in volume by evaporation, and cooled to precipitate melamine, which was filtered and dried.

The proportions of the reactants can be varied widely; but it is preferred to have ammonia in excess to prevent decomposition of the melamine. Any one of the reactants can be present initially in an amount about 20 times the weight of either of the other two reactants, and some melamine will be obtained. It is not necessary to add ammonia and carbon dioxide as such; they can be added as ammonium carbamate or as a similar compound that breaks down into ammonia and carbon dioxide when heated. The pressure can be varied considerably. It can be as low as 500 p. s. i. and as high as 5000 p. s. i. or even higher. The temperature can range between 200 and 450° C., but is preferably about 350° C. The reaction period can range between a few minutes to 20 hours or longer, depending upon the temperature. At a temperature of over 400° C. the reaction is completed in 15 minutes or less, whereas at lower temperatures, of the order of 250° C. or less, several hours are required.

In one preferred embodiment of the invention the reaction is carried out in a continuous reactor of any well-known type adapted to resist the temperatures and pressures encountered in the reaction. The continuous reactor is advantageous in that it permits the rapid heating of the hydrogen cyanide to reaction temperature thereby reducing its polymerization. To this end hydrogen cyanide, ammonia, and carbon dioxide preferably but not necessarily in the proportions of the example are pumped under a pressure of at least 500 p. s. i. into a tube of stainless steel or the like maintained at about 350° C. at a rate such that the residence time of the reaction vapors in the tube is about 20 seconds. The residence time can be varied considerably, however. The dimensions of the tube are not critical. A tube 3 feet long by 3 inches inner diameter is suitable. The tube discharges through a pressure release valve into a chamber maintained at substantially atmospheric pressure and at a temperature high enough to maintain by-product ammonium carbamate in the vapor state but not at a temperature so high that the vapor pressure of melamine is appreciable. These limits are about 100°–350° C. Preferably the discharge chamber is maintained at about 150° C. Unreacted gases are collected and recycled.

While the invention has been described with particular reference to specific embodiments, it is to be understood that it is not to be limited thereto but is to be construed broadly and restricted solely by the scope of the appended claims.

I claim:

1. The method of making melamine that comprises heating together ammonia, carbon dioxide and hydrogen cyanide at a temperature of at least 200° C. and at a pressure of at least 500 p. s. i., and separating melamine from the thus-formed reaction mass.

2. The method according to claim 1 in which the temperature is about 350° C.

3. The method according to claim 2 in which the reaction is conducted continuously.

NAT H. MARSH.

No references cited.